United States Patent
Sobczyk

(10) Patent No.: US 11,338,379 B2
(45) Date of Patent: May 24, 2022

(54) DEVICE AND METHOD FOR PRODUCING A CHAMFER ON A TOOTHED WORKPIECE WHEEL

(71) Applicant: Profilator GmbH & Co. KG, Wuppertal (DE)

(72) Inventor: Marcel Sobczyk, Solingen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 264 days.

(21) Appl. No.: 16/061,710

(22) PCT Filed: Dec. 14, 2016

(86) PCT No.: PCT/EP2016/080963
§ 371 (c)(1),
(2) Date: Nov. 2, 2018

(87) PCT Pub. No.: WO2017/102824
PCT Pub. Date: Jun. 22, 2017

(65) Prior Publication Data
US 2019/0054554 A1    Feb. 21, 2019

(30) Foreign Application Priority Data

Dec. 15, 2015  (DE) .......................... 102015121821.6

(51) Int. Cl.
*B23F 5/16* (2006.01)
*B23F 17/00* (2006.01)
*B23F 19/10* (2006.01)

(52) U.S. Cl.
CPC ............ *B23F 5/163* (2013.01); *B23F 17/006* (2013.01); *B23F 19/101* (2013.01)

(58) Field of Classification Search
CPC .. B23F 5/16; B23F 5/163; B23F 5/166; B23F 5/18; B23F 5/20; B23F 5/202;
(Continued)

(56) References Cited

U.S. PATENT DOCUMENTS

| 2,206,443 A | 7/1940 | Barter et al. |
| 2,758,512 A | 8/1956 | Christman |

(Continued)

FOREIGN PATENT DOCUMENTS

| DE | 10230148 A1 | 1/2004 | |
| DE | 102013012797 A1 * | 2/2015 | ................ B23F 5/20 |

(Continued)

OTHER PUBLICATIONS

Werkstatt, et al:"Abdachen und Verzahnen in einer Aufspannung Herstellung von Zahnrädem und verzahnten Bauteilen", vol. 146, No. 11, Nov. 1, 2013, 2 pages.

(Continued)

*Primary Examiner* — Alan Snyder
(74) *Attorney, Agent, or Firm* — Whitmyer IP Group LLC

(57) ABSTRACT

A method for producing a toothed workpiece wheel, the tooth root of which adjoins an end face of the workpiece wheel with a chamfer extending into the tooth flanks being formed, wherein the toothing of the workpiece wheel is created by skiving with a gear-cutting tool which has a first number of cutting teeth that each form cutting edges and the rotation axis of which is at a first crossed-axes angle to the axis of rotation of the workpiece wheel, with an infeed in a first infeed direction parallel to the direction of extension of the tooth flanks to be produced and of the tooth root. The chamfer is created by skiving with a chamfering tool which has a second number of cutting teeth that each form cutting edges and the rotation axis of which is at a second crossed-axes angle to the axis of the workpiece wheel, with an infeed in a second infeed direction parallel to the direction of extension of the chamfer to be produced in the tooth root. Also disclosed is an associated tool set.

8 Claims, 7 Drawing Sheets

(58) Field of Classification Search
CPC ........ B23F 5/205; B23F 19/10; B23F 19/101;
B23F 19/102; B23F 19/104; B23F
19/105; B23F 19/107; B23F 17/006;
Y10T 409/101113; Y10T 409/101272;
Y10T 409/101749; Y10T 409/102385;
Y10T 409/103975; Y10T 409/106201;
Y10T 409/10795; Y10T 409/108427
See application file for complete search history.

(56) References Cited

U.S. PATENT DOCUMENTS

| | | | | |
|---|---|---|---|---|
| 2005/0260050 A1* | 11/2005 | Ribbeck | ................ | B23Q 1/621 |
| | | | | 409/39 |
| 2007/0186398 A1* | 8/2007 | Lee | ................ | B23F 19/12 |
| | | | | 29/56.5 |
| 2009/0060672 A1* | 3/2009 | Fitzgerald | ................ | B23F 9/082 |
| | | | | 409/31 |
| 2010/0278605 A1* | 11/2010 | Philippin | ................ | B23F 19/102 |
| | | | | 409/8 |
| 2016/0158861 A1* | 6/2016 | Kleinbach | ................ | B23F 5/20 |
| | | | | 409/8 |

FOREIGN PATENT DOCUMENTS

| | | | |
|---|---|---|---|
| EP | 2954967 | A1 | 12/2015 |
| GB | 868016 | A | 5/1961 |
| GB | 1349127 | A | 3/1974 |
| WO | 2007045610 | A1 | 4/2007 |
| WO | 2010079113 | A2 | 7/2010 |
| WO | 2015185186 | A1 | 12/2015 |

OTHER PUBLICATIONS

International Search Report and Translation, Application No. PCT/EP2016/080963, Completed: Mar. 20, 2017; dated Mar. 27, 2017, 7 pages.
Written Opinion of the International Searching Authority, Application No. PCT/EP2016/080963, Completed: Mar. 20, 2017, 8 pages.

* cited by examiner

DEVICE AND METHOD FOR PRODUCING A CHAMFER ON A TOOTHED WORKPIECE WHEEL

TECHNICAL FIELD

The invention relates to a method for producing a toothed workpiece wheel, the tooth root of which adjoins an end face of the workpiece wheel with a chamfer extending into the tooth flanks being formed, wherein the toothing of the workpiece wheel is created by skiving with a gear-cutting tool, which has a first number of cutting teeth that each form cutting edges and the axis of rotation of which is at a first crossed-axes angle to the axis of rotation of the workpiece wheel, with an infeed in a first infeed direction parallel to the direction of extension of the tooth flanks to be produced and of the tooth root. The invention furthermore relates to a tool set for carrying out the method consisting of a gear-cutting tool and a chamfer tool. The invention further relates to a device for carrying out the method with a workpiece spindle and at least one tool spindle as well as an electronic controller for controlling rotary drive aggregates and adjusting aggregates for creating a rotational movement of the respective spindle of an infeed as well as for changing a crossed-axes angle between the spindle axes.

BACKGROUND

A method for toothing toothed wheels is known from WO 2007/045610 A1, in which a skiving wheel is used as gear-cutting tool. The skiving wheel has cutting edges, which are formed by the edges, on which the tooth flanks adjoin the end face.

The invention is based on the object of specifying a method, a device and a tool set, by means of which a toothing with a chamfer can be produced in the area between tooth root and end face of the workpiece wheel.

SUMMARY

The object is solved by means of the invention specified in the claims, wherein the subclaims do not only represent advantageous further developments of the independent claims, but also independent solutions of the object.

To begin with and essentially, it is provided that the toothing of the workpiece wheel is created by skiving with a gear-cutting tool. The gear-cutting tool is a skiving wheel in the form of a toothed wheel, the teeth of which form a first number of cutting teeth. The cutting teeth each form cutting edges. The cutting edges can be located in the transition area of the tooth flanks of the cutting wheel to an end face of the cutting tooth. The end faces of the cutting teeth can be located in a shared plane. However, they can also be arranged so as to be offset relative to one another in a step-like manner. The cutting teeth preferably run at an angle of inclination to the axis of rotation of the gear-cutting tool. In response to the skiving for the production of the toothing, the axis of rotation of the gear-cutting tool is at a crossed-axes angle to the axis of rotation of the workpiece wheel, which is to be provided with a number of teeth, for the purpose of which tooth gaps are cut between the teeth. The workpiece wheel and the gear-cutting tool are driven synchronously to one another for this purpose. For this purpose, the device has a tool spindle for accommodating the tool and a workpiece spindle for accommodating the workpiece wheel. The two spindles are each rotationally driven by electrical rotary drive aggregates. Additional adjusting aggregates are provided to create an infeed and to adjust the crossed-axes angle. In response to the toothing, the infeed takes place in a first infeed direction, which runs parallel to the direction of extension of the tooth flanks to be produced and of the tooth root to be produced. The chamfer is produced after the production of the toothing, which can be carried out in a plurality of consecutive steps, wherein the axial distance between workpiece wheel axis of rotation and tool axis of rotation is changed gradually. A finishing step can follow one or a plurality of roughing steps in response to the production of the toothing. According to the invention, the production of the chamfer also takes place by means of skiving with a toothed skiving tool, which forms a chamfer tool. The chamfer tool has a second number of cutting teeth, which also form cutting edges. These cutting edges can also be embodied by the edges, at which the tooth flanks of the cutting teeth transition into an end face of the cutting tooth. These cutting teeth can also have an angle of inclination to the axis of rotation of the chamfer tool. The end faces of the cutting teeth can be located in a shared plane. It can also be provided, however, that the end faces run relative to one another in a step-like manner. The axis of rotation of the chamfer tool is in a second crossed-axes angle to the axis of rotation of the workpiece wheel. The workpiece wheel and the chamfer tool are rotationally driven synchronously to one another. A relative displacement of the workpiece spindle as compared to the tool spindle takes place to create an infeed, which is directed in a second infeed direction. The second infeed direction runs parallel to the direction of extension of the chamfer to be produced in the tooth root. The second infeed direction is created by an overlapping of a displacement direction in the tooth flank direction of extension of the workpiece wheel and in the rotation plane of the workpiece wheel, wherein the movement components are matched to one another in such a way that the desired chamfer angle is set in the preferred range of between 15° and 45°. To carry out the method, a tool set is used, which consists of a gear-cutting tool and a chamfer tool. Both tools are formed by skiving wheels. The contour of the teeth in the rotation plane of the respective skiving wheel deviates from one another. While the teeth of the gear-cutting tool run symmetrically to a radial drawn through the tooth center, a profile correction is carried out in the case of the cutting teeth of the chamfer tool, so that the lateral tooth flanks do not run symmetrically to a radial drawn through the tooth center. Starting at the tooth base, one of the two tooth flanks is recessed in a wedge-shaped manner in the direction of the tooth head of the cutting tooth. Starting at the tooth head towards the tooth base, the tooth flank located opposite thereto is recessed in a wedge-shaped manner. It is further provided that the number of the cutting teeth in the case of the gear-cutting tool and in the case of the chamfer tool differ. The number of the cutting teeth of the gear-cutting tool is preferably larger than the number of the cutting teeth of the chamfer tool. It is in particular provided that the quotient of the number of the cutting teeth of the gear-cutting tool is $\geq \frac{1}{2}$ to the number of the teeth of the workpiece wheel and that the quotient of the number of the cutting teeth of the chamfer tool is $\leq \frac{1}{2}$, preferably $\leq \frac{1}{3}$, to the number of the teeth of the workpiece wheel. The gear-cutting tool is designed in such a way that the crossed-axes angle between axis of rotation of the gear-cutting tool, thus axis of rotation of the tool spindle, and axis of rotation of the workpiece wheel, thus axis of rotation of the workpiece spindle, is approximately 20° (20°±5°), preferably in a range of between 15° and 30°. The chamfer tool is designed in such a way that the crossed-axes angle between axis of rotation of the chamfer tool and axis of rotation of the workpiece wheel is smaller in response to the creation of the chamfer. Here, the crossed-axes angle can be in the range of 10° (10°±5°), preferably in a range of between 5° and 20°. Particularly preferably, the second crossed-axes angle is at least 10° smaller than the first crossed-axes angle. The device prepared for carrying out the method has at least one workpiece spindle and a tool spindle. The workpiece spindle supports the workpiece wheel. The tool spindle supports the tooting tool or the chamfer tool, respectively. It is in particular provided that the gear-cutting tool and the chamfer tool form a combi tool, which can be rotationally driven by a shared tool spindle. Chamfer tool and gear-cutting tool are arranged coaxially to one another and are connected to one another in a rotationally fixed manner, wherein the chamfer tool, which has a smaller diameter as compared to the gear-cutting tool, is arranged upstream of the gear-cutting tool in the direction towards the free end of the tool spindle. In one variation, however, it can also be provided that the chamfer tool and the gear-cutting tool are each rotationally driven by an assigned tool spindle, so that the device has at least two tool spindles and at least one workpiece spindle. To carry out the method, a blank, which is in particular an untoothed workpiece wheel, is clamped into a chuck of the workpiece spindle. The toothing is created by means of a gear-cutting tool, which is rotationally driven synchronously tot eh workpiece spindle by means of a tool spindle. This can take place in a plurality of consecutive steps, in which the gear-cutting tool, which is rotationally driven at a crossed-axes angle to the workpiece wheel, is in each case shifted in the tooth direction of extension of the teeth of the workpiece wheel, so that chips are removed from the tooth gaps of the workpiece wheel, which are to be created, in response to a cutting movement. A fine machining takes place in response to a reduced infeed and reduced depth of cut after a roughing, which was performed in a plurality of steps, if necessary, in response to which the axial distance between workpiece axis of rotation and tool axis of rotation has been changed in each case. The toothing is followed by a further machining step, in response to which the chamfer is created. For this purpose, a chamfer tool is rotationally driven by means of the same or another tool spindle. This takes place with a changed crossed-axes angle and with a changed speed ratio between workpiece spindle and tool spindle. Here, the infeed takes place in an infeed direction, which runs in the direction of extension of the chamfer in the tooth root of the tooth gap of the workpiece wheel. Due to the geometric ratios in response to a mutual rolling motion of the tooth flanks of the workpiece wheel on the cutting edges of the chamfer tool, the lateral tooth flanks of the teeth of the workpiece wheel adjacent to the tooth root obtain chamfer courses, which differ from one another. To compensate the deviation of these chamfer courses, the cutting edges of the chamfer tool have the asymmetry, which is formed by the above-mentioned profile correction. Based on a radial, which is located in the end face, intersects the axis of rotation and runs centrally through the cutting tooth, the two cutting edges have different angles of inclination. When placing a line of best fit through each of the two tooth flanks or cutting edges, respectively, these two lines of best fit intersect the radial at angles, which differ from one another.

BRIEF DESCRIPTION OF THE DRAWINGS

An exemplary embodiment of the invention will be described below by means of enclosed drawings.

DETAILED DESCRIPTION

Figure 14:
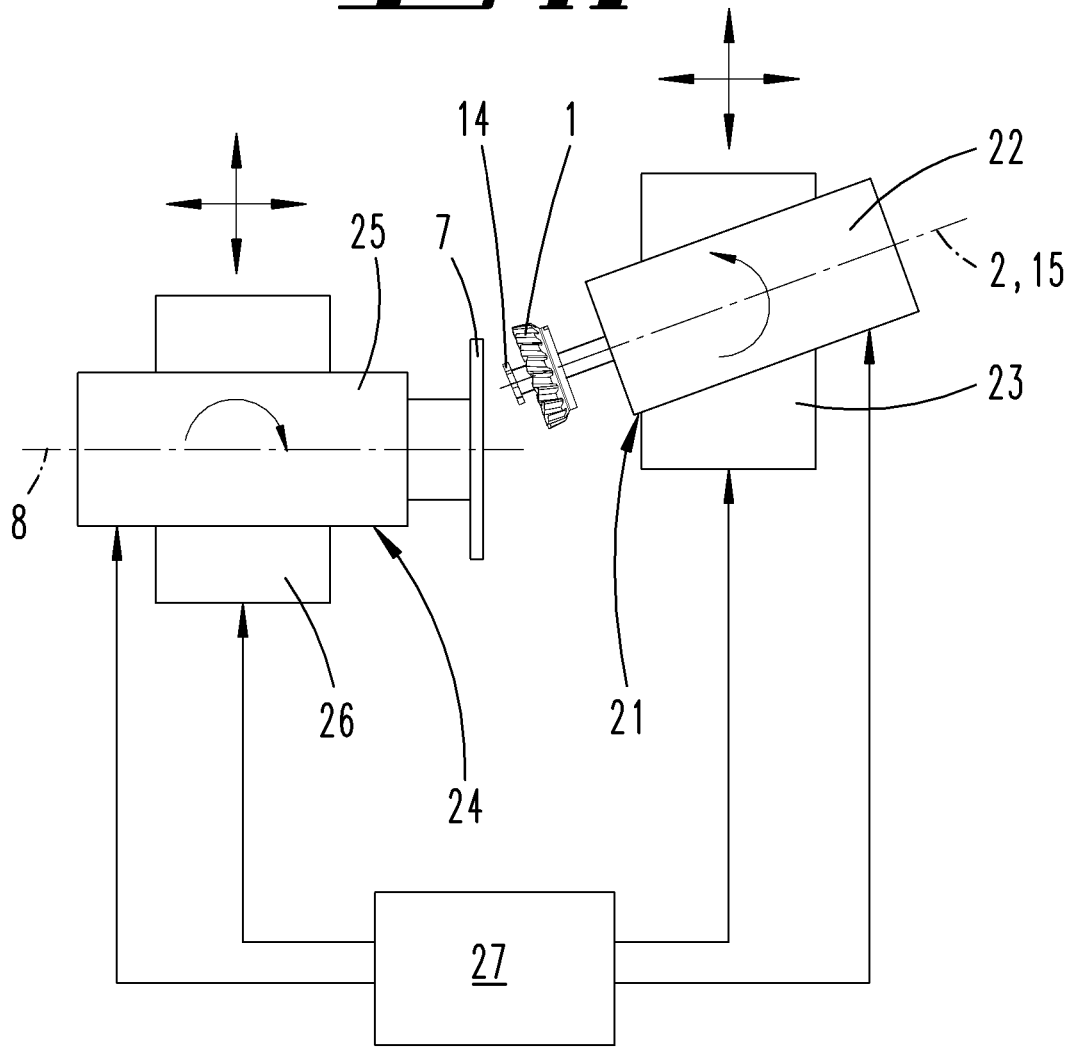

FIG. 14 shows a machine tool comprising a non-illustrated tool bed, which is the support of adjusting aggregates 23, 26, in a schematic view. A workpiece spindle 24 and a tool spindle 21 can be adjusted against one another in a plurality of spatial directions by means of the adjusting aggregates 26, 23. The rotary positions of the tool spindle 21 and of the workpiece spindle 24 can furthermore be set relative to one another.

The workpiece spindle 24 supports a blank to be machined in the form of a preferably untoothed workpiece wheel 7, which is to obtain a plurality $N_0$ of teeth. The tool spindle 21 supports a gear-cutting tool 1 and a chamfer tool 14 with a smaller diameter, in the direction towards the free end of the tool spindle 21 offset to the gear-cutting tool 1 coaxially to the gear-cutting tool 1. The workpiece wheel 7 and the two tools 1, 14 can be brought into a rotational movement around the respective axes of rotation 8, 2, 15 by means of rotary drive aggregates 22, 25.

An electronic control device 27 is provided, which can be programmed and by means of which a toothing and a subsequent chamfer creation can be carried out in a program-controlled manner. For this purpose, the workpiece wheel 7 and the tools 1, 14 are rotationally driven so as to be synchronized relative to one another at a speed ratio, which corresponds to the respective tooth number ratio $N_1/N_0$ or $N_2/N_0$, respectively.

FIGS. 1 to 4 show a first machining step, in response to which teeth 9 with tooth gaps 10 located there between are created in a workpiece wheel 7 by means of a gear-cutting tool 1. The tooth gaps have a tooth root 11" and two lateral tooth flanks 11, 11'.

The gear-cutting tool 1 has a plurality $N_1$ of cutting teeth 3 that each form cutting edges 4. The tooth gap 10 is produced in a skiving movement by means of the cutting edges 4, for the purpose of which the cutting teeth 3 perform a rolling motion on the tooth flanks 11, 11' or the tooth root 11", respectively, in such a way that a machining takes place as a result of a crossed-axes angle $\alpha_1$ between the axis of rotation 2 of the gear-cutting tool 1 and the axis of rotation 8 of the workpiece wheel 7.

In the case of the exemplary embodiment, the tooth flanks 6 of the cutting teeth 3, which run at an incline to the axis of rotation 2, each transition into an end face 5 of a cutting tooth 3 by forming a right-angled edge. These transition edges form the cutting edges 4. The end faces 5 are arranged in a step-like manner.

Figure 1:
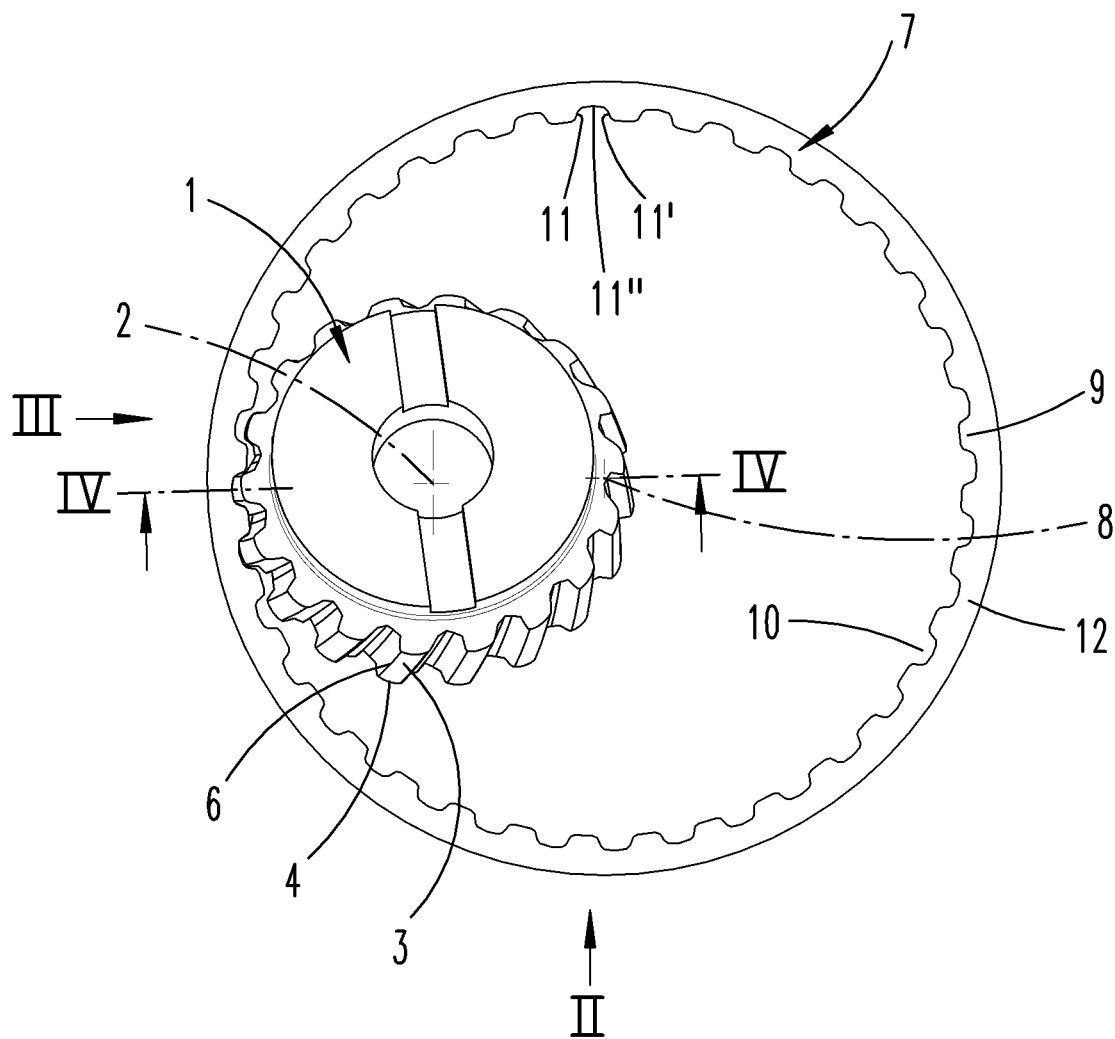
FIG. 1 shows the top view in the axial direction of the axis of rotation 8 of the workpiece wheel 7 with gear-cutting tool 1, which is illustrated in machining engagement, the cutting teeth 3 of which engage with tooth gaps 10 of the workpiece wheel 7, wherein the gear-cutting tool 1 is rotationally driven about an axis of rotation 2.
Figure 2:
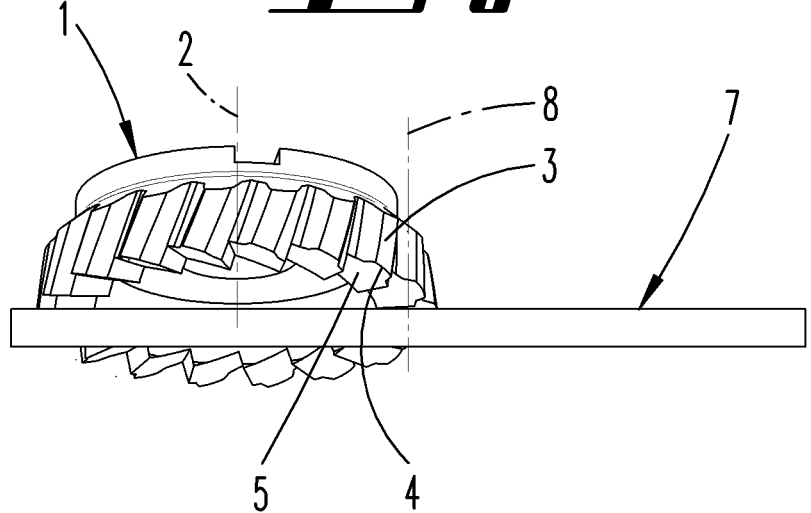
FIG. 2 shows a side view in the direction of the arrow II in FIG. 1 to clarify the apexes, which run on a conical enveloping surface of the cutting teeth 3 and of the cutting engagement of the cutting edges 4 with the tooth gaps 10.
Figure 3:
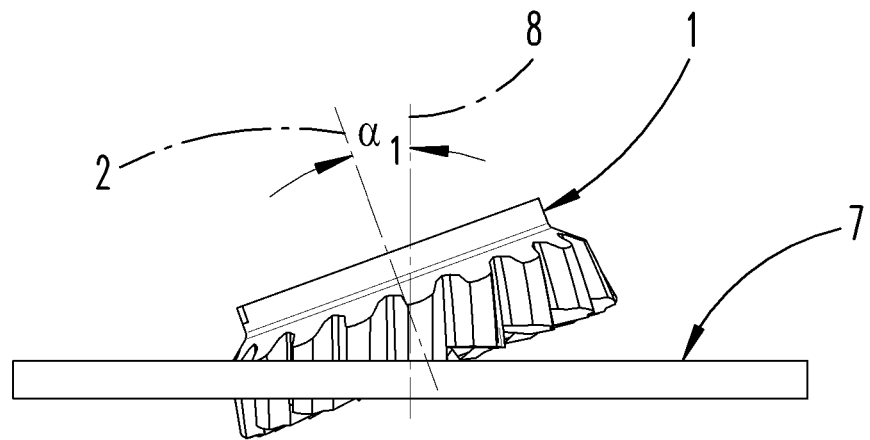
FIG. 3 shows the side view according to arrow III in FIG. 1 to clarify the first crossed-axes angle $\alpha_1$ between the axis of rotation 2 of the gear-cutting tool 1 and the axis of rotation 8 of the workpiece wheel 7.
Figure 4:
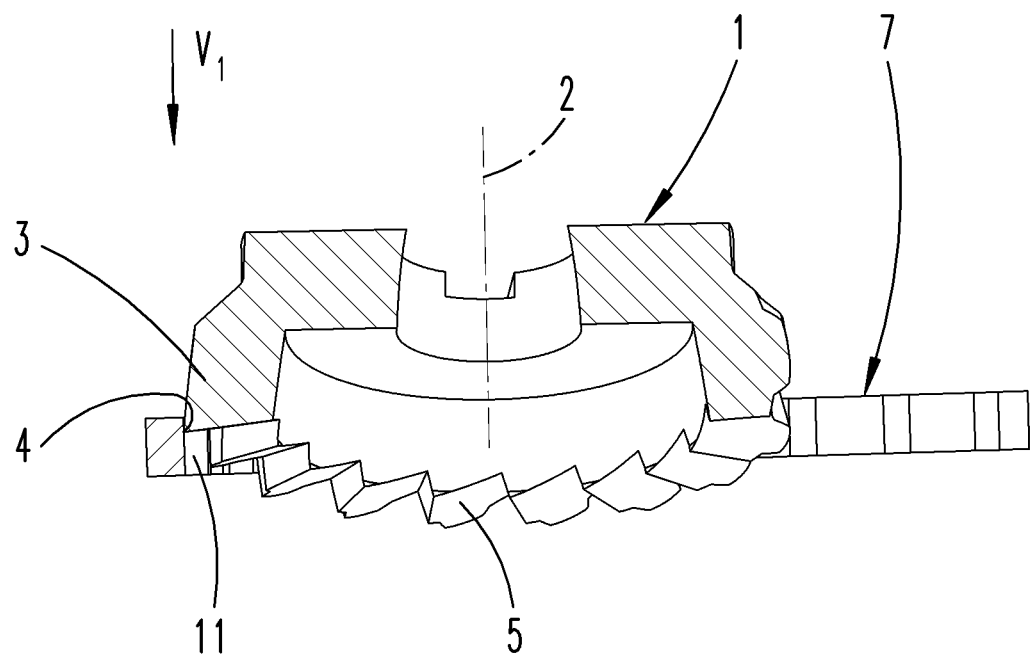
FIG. 4 shows the section according to line IV-IV in FIG. 1 to clarify the contact point of a cutting edge 4 with a tooth flank 11 of the workpiece wheel 7 and of the infeed $V_1$.
Figure 5:
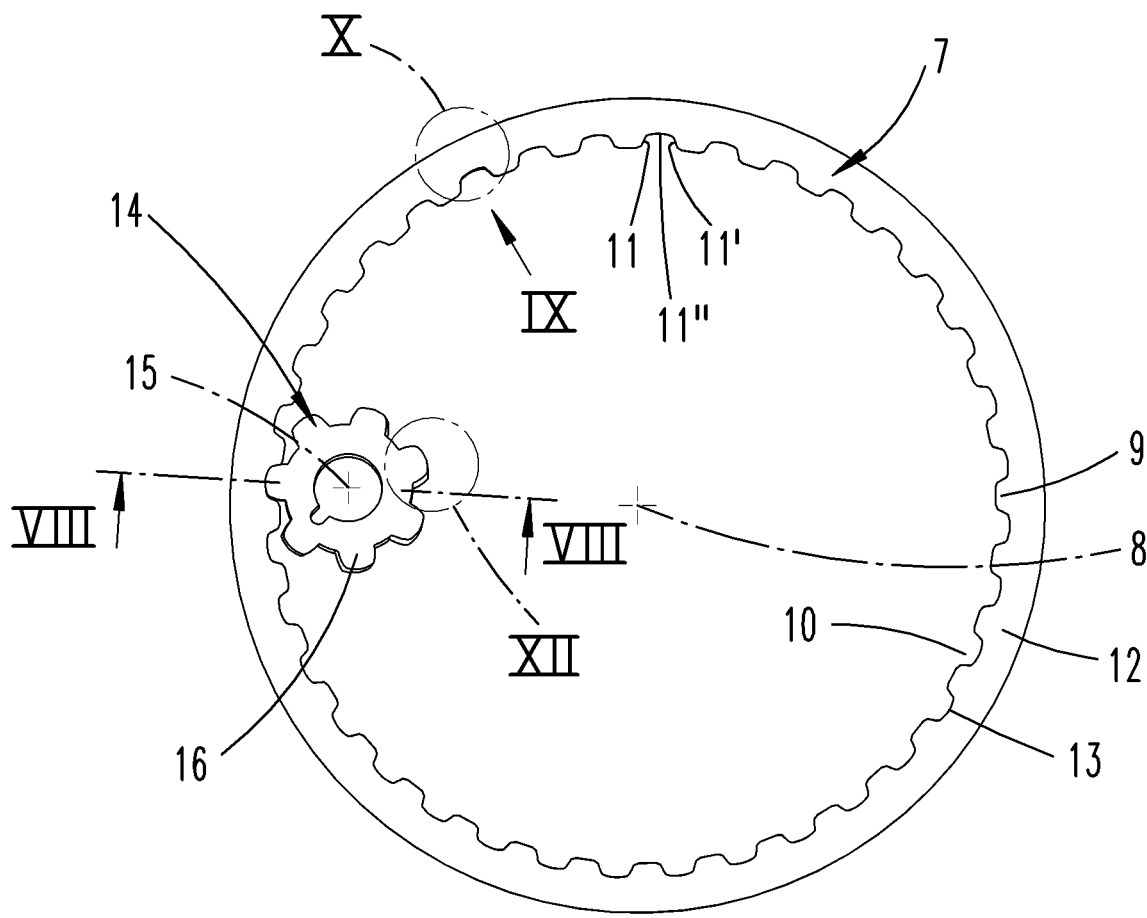
FIG. 5 shows an illustration according to FIG. 1, but in response to the creation of a chamfer 13, wherein a chamfer tool 14, which is rotationally driven about an axis of rotation 15, forms cutting teeth 16, which engage with the tooth gaps 10 of the workpiece wheel 7.
Figure 6:
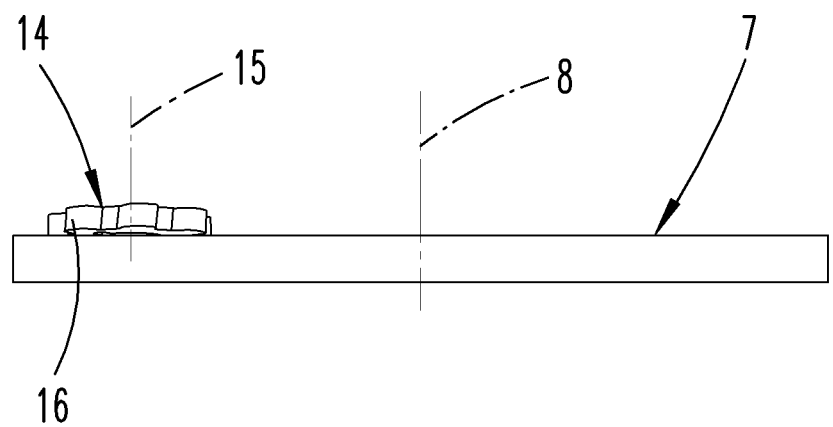
FIG. 6 shows an illustration according to FIG. 2, but in response to the creation of the chamfer.
Figure 7:
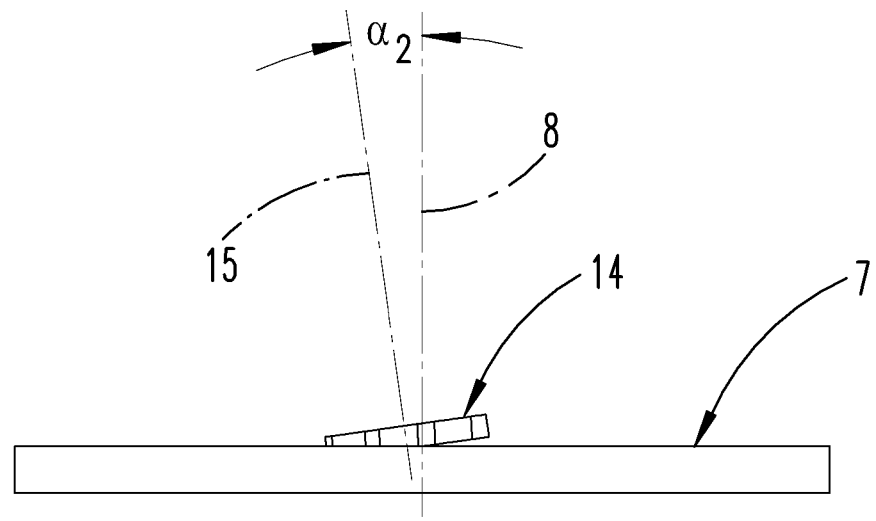
FIG. 7 shows an illustration according to FIG. 3, but in response to the creation of the chamfer to clarify the crossed-axes angle $\alpha_2$ between the axis of rotation 15 of the chamfer tool 14 and the axis of rotation 8 of the workpiece wheel 7.

FIG. 4 clarifies the direction of the infeed $V_1$ in response to the toothing. The infeed direction $V_1$ corresponds to the axial direction of extension of the tooth flanks 11, 11' or of the tooth root 11", respectively, of the tooth gaps 10 of the workpiece wheel 7.

The toothing can be carried out in a plurality of consecutive machining steps, wherein the tooth gap 10 is gradually deepened to the final depth. The axial distance between the axes of rotation 2, 8 is thereby changed gradually. The last machining step can be a fine machining step.

A skiving chamfer creation, as it will be described below by means of FIGS. 5 to 8, follows the skiving toothing:

As is the gear-cutting tool 1, the chamfer tool 14 is a cutting tool, which is equipped with a plurality $N_2$ of cutting teeth 16. In the case of the chamfer tool 14, the apex lines of the cutting teeth 16 also run at an incline to the axis of rotation 15 of the chamfer tool 14, but at a reduced angle of inclination as compared to the gear-cutting tool 1. Here, the tooth flanks 18 also form respective cutting edges 17, 17', 17" in the area of their transition edge to the end face 19 of the cutting tooth 16, wherein the cutting edges 17, 17' are lateral cutting edges for the creation of a chamfer 13 in the area of the lateral tooth flanks 11, 11', and the cutting edge 17" is a head-side cutting edge for creating the chamfer 13 in the area of the tooth root 11" of the tooth gap 10 of the workpiece wheel 7.

In the case of the chamfer tool 14, the end faces 19 of the cutting teeth 16 are located in a shared end face plane, which is located in the rotation plane of the chamfer tool 14.

While the toothing described with reference to FIGS. 1 to 4 is carried out at a first crossed-axes angle $\alpha_1$ of approximately 20°, the creation of the chamfer 13 illustrated in FIGS. 5 to 8 is carried out at a second crossed-axes angle $\alpha_2$ between the axis of rotation 15 of the chamfer tool 14 and the axis of rotation 8 of the workpiece wheel 7, which is approximately 10°.

Figure 8:
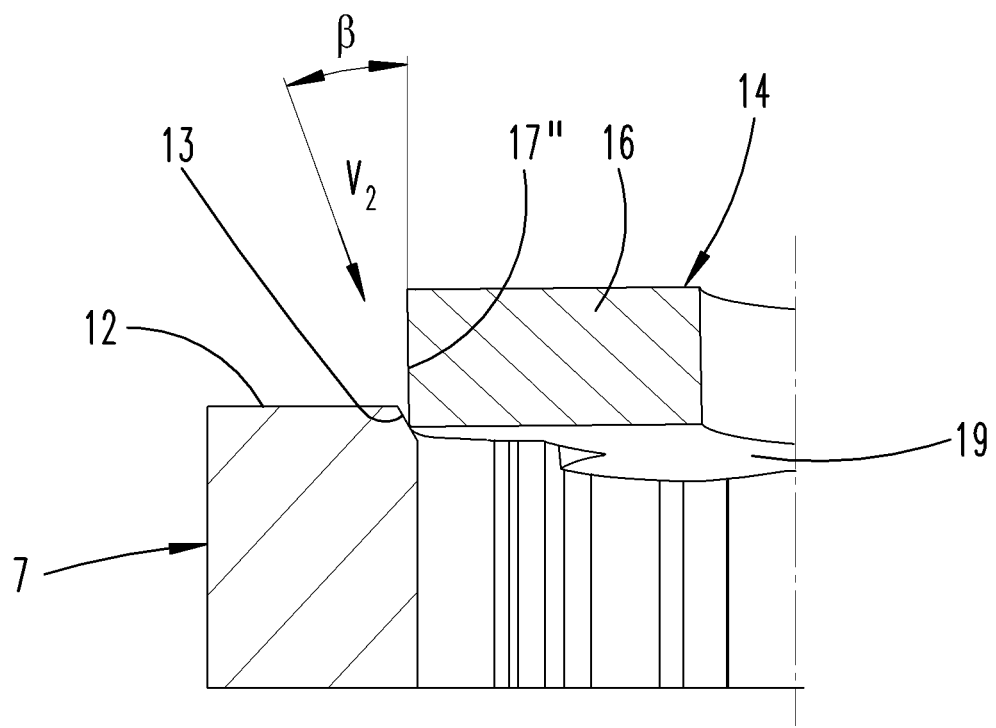
FIG. 8 shows an illustration according to section VIII-VIII in FIG. 5 to clarify the infeed $V_2$ in response to the creation of the chamfer and of the engagement of a cutting edge 17" for creating the chamfer 13.

With the arrow $V_2$, FIG. 8 shows the infeed direction, in which the chamfer tool 14 is displaced with respect to the workpiece wheel 7 in response to the creation of the chamfer 13. The infeed direction $V_2$ runs approximately at a 30° angle β to the end face 12 of the workpiece wheel 7. In contrast, the infeed $V_1$ according to arrow in FIG. 4 in response to the toothing runs perpendicular to the end face 12 of the workpiece wheel 7.

Figure 9:
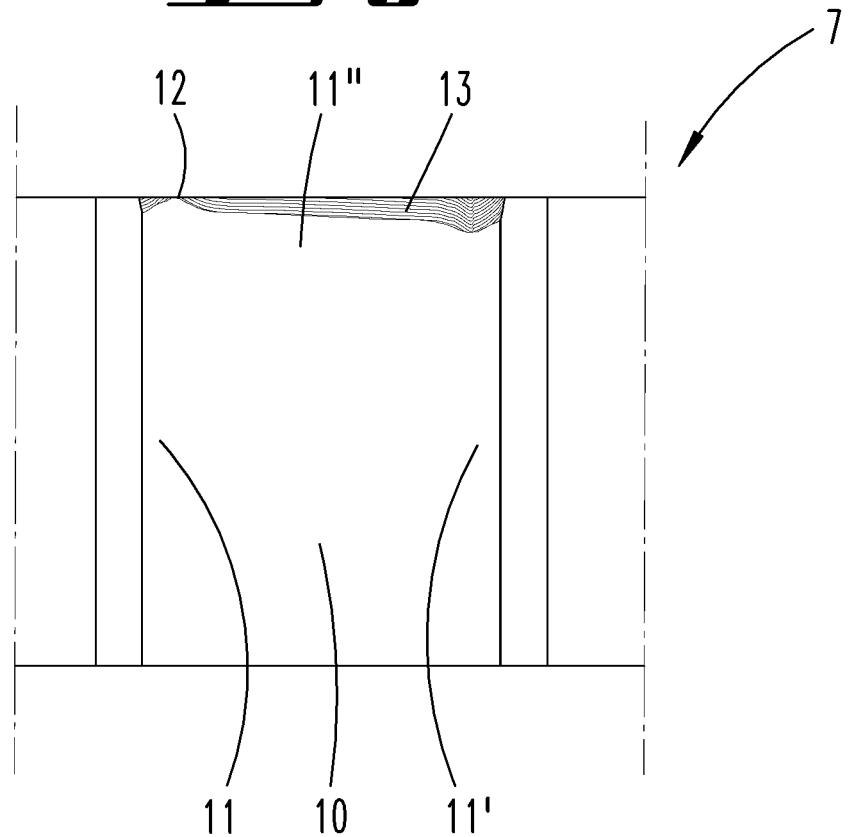
FIG. 9 shows the view onto a tooth gap 10 of the workpiece wheel 7 in the viewing direction of the arrow IX in FIG. 5 in an enlarged manner.
Figure 10:
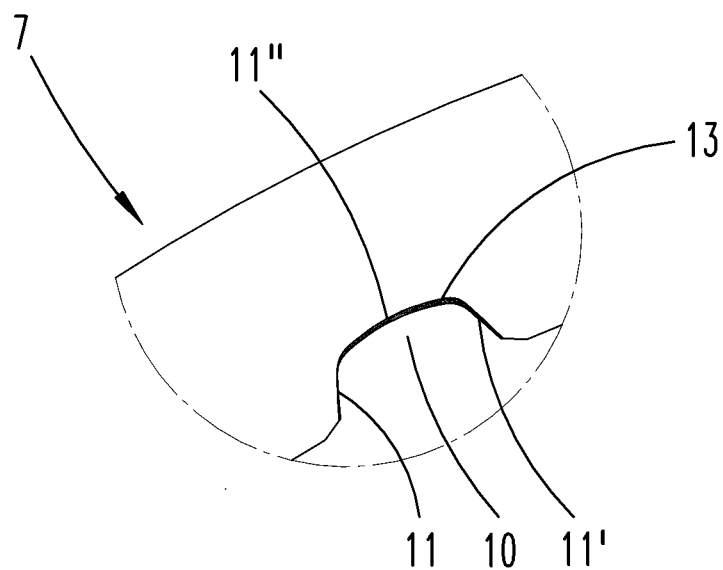
FIG. 10 shows the section X-X in FIG. 5 in an enlarged manner.
Figure 11:
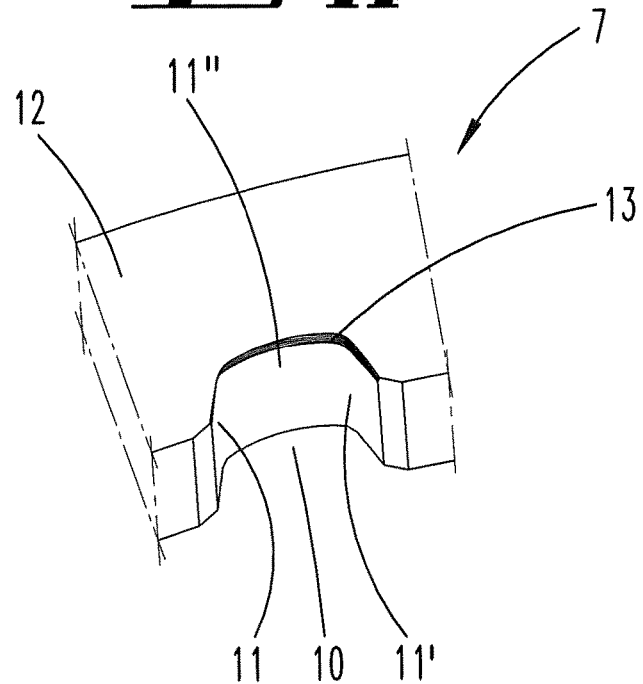
FIG. 11 shows a perspective illustration of the chamfer 13.

The chamfer 13 is to be created in the area of the transition edge of the end face 12 to the tooth root 11" of the tooth gap 10 of the workpiece wheel 7. The created chamfer 13 is to furthermore extend all the way into the transition edges of the end face into the lateral tooth flanks 11, 11' of the tooth gap 10 or of a tooth 9 of the workpiece wheel 7 arranged between two tooth gaps 10, respectively. While the section of the chamfer 13 assigned to the tooth root 11" is created by a head-side section 17" of the cutting edge of the cutting tooth 16, the two lateral tooth flanks 11, 11' are created by lateral cutting edges 17, 17' of the cutting tooth 16. As a result of the angle between the lateral tooth flanks 11, 11' to the tooth root 11", the contour shape of the section of the chamfer 13, which is assigned to the lateral tooth flanks 11, 11', deviates from the contour shape of the section of the fiber 13, which is assigned to the tooth root 11", as is shown in FIGS. 9 to 11

Figure 12:
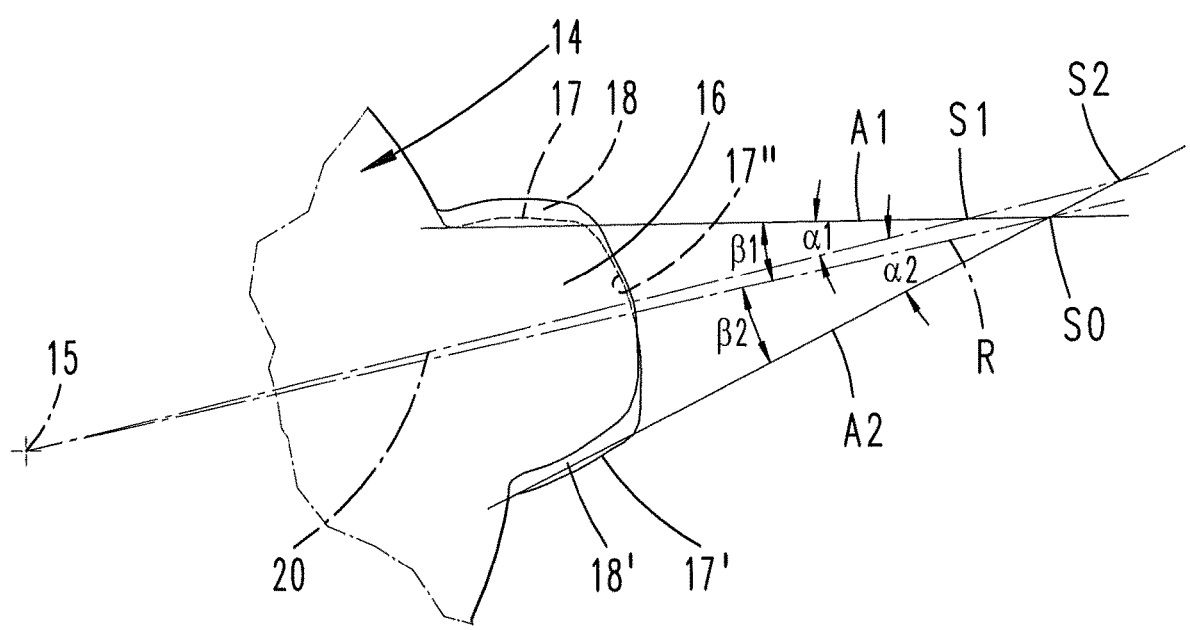
FIG. 12 shows the section XII-XII in FIG. 5, a cutting tooth 16 of the chamfer tool 14 in an enlarged manner.
Figure 13:
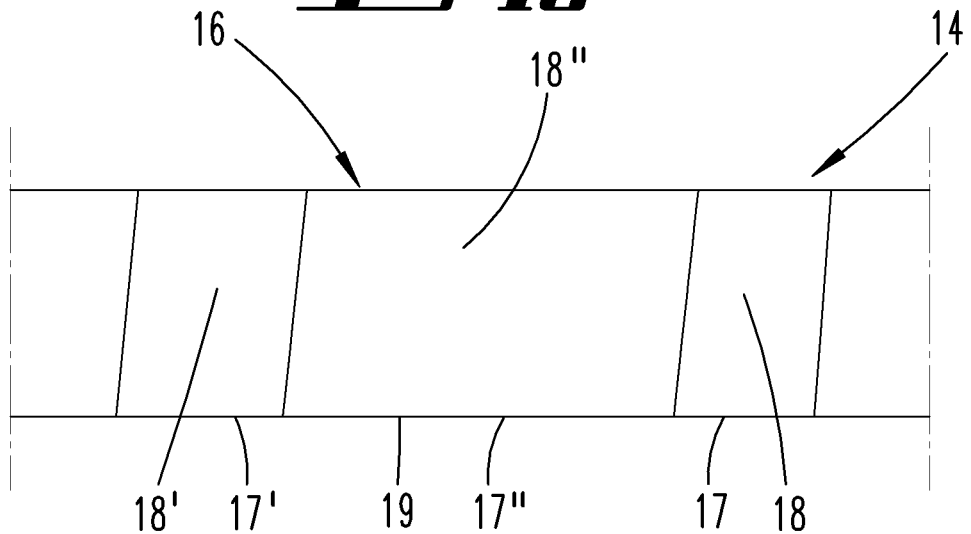
FIG. 13 shows the view according to arrow XIII in FIG. 12 onto the tooth head of a cutting tooth 16 and FIG. 14 shows the essential elements of a device for carrying out the method in a schematic view.

To compensate the asymmetry of the chamfer course, which can only be avoided with difficulty as a result of the movement geometry, the cutting teeth 16 of the chamfer tool 14 obtain a profile correction. With reference numeral 20, FIG. 12 shows a center line through a cutting tooth 16, which runs through the axes of rotation 15 of the chamfer tool 14. In contrast to this center line 20, the two lateral cutting edges 17, 17' are designed asymmetrically. The cutting edge 17 runs at a smaller flank angle as compared to an imaginary symmetrical envelop curve. In contrast, the cutting edge 17' runs steeper as compared to such an envelope curve. In contrast to this envelope curve, the tooth head-side end point of the cutting edge 17 is positionally offset in the direction of the center line. The base point of the cutting edge 17, however, is located in the imaginary symmetrical envelope curve. In the case of the cutting edge 17', the head point is located in the imaginary envelope curve. The base point of the cutting edge 17', however, is slightly offset in the direction of the center line 20 as compared to the symmetrical envelope curve.

If one were to draw a line of best fit through each of the two cutting edges 17, 17', for instance in such a way that it follows through the transition point of the cutting edge 17, 17' to the tooth base and through the transition point of the cutting edge 17, 17' and of the end face cutting edge 17", these two straight lines intersect the center line 20 at different angles and also at a different distance to the center point of the chamfer tool 14.

The above explanations serve to describe the inventions, which are captured by the application as a whole, which further develop the prior art at least by means of the following feature combinations, in each case also independently, namely:

A method, which is characterized in that the chamfer 13 is created by skiving with a chamfer tool 14, which has a second number $N_2$ of cutting teeth 16 that each form cutting edges 17, 17', 17" and the axis of rotation 15 of which is at a second crossed-axes angle $\alpha_2$ to the axis 8 of the workpiece wheel 7, with an infeed in a second infeed direction $V_2$ parallel to the direction of extension of the chamfer 13 to be produced in the tooth root 11".

A tool set for producing a toothed workpiece wheel 7, the tooth root 11" of which adjoins an end face 12 of the workpiece wheel 7 with a chamfer 13 extending into the tooth flanks 11, 11' being formed, comprising a gear-cutting tool 1, which can be rotationally driven about an axis of rotation 2 and which has a first number $N_1$ of first cutting teeth 3 that each form cutting edges 4, which are formed in such a way that the toothing can be produced therewith by means of skiving in response to an infeed in a first infeed direction $V_1$, and comprising a chamfer tool 14, which can be driven about an axis of rotation 15 and which has a second number $N_2$ of second cutting teeth 16 that each form cutting edges 17, 17', 17", which are formed in such a way that the chamfer 13 can be produced therewith by means of skiving in response to an infeed in a second infeed direction $V_2$, which differs from the first infeed direction $V_1$.

A device, which is characterized in that the electronic controller 27 is programmed in such a way that the device operates according to a method of the invention.

A method, which is characterized in that the first number $N_1$ of cutting teeth 3 is larger than the second number $N_2$ of cutting teeth 16.

A method, a tool set or a device, which are characterized in that the quotient of first number $N_1$ of cutting teeth 3 to a number $N_0$ of teeth 9 of the workpiece wheel 7 is $\geq \frac{1}{2}$.

Method, tool set or device, which is characterized in that the quotient of the second number $N_2$ of the cutting teeth 16 and a number $N_0$ of the teeth 9 of the workpiece wheel 7 is $\geq \frac{1}{3}$.

Method, tool set or device, which are characterized in that the first crossed-axes angle $\alpha_1$ is larger than the second crossed-axes angle $\alpha_2$.

Method, tool set or device, which are characterized in that the first crossed-axes angle $\alpha_1$ is at least 10° larger than the second crossed-axes angle $\alpha_2$.

Method, tool set or device, which are characterized in that the flank-side cutting edges 17, 17' of the chamfer tool 14 run asymmetrically to a central radial 20, which runs through the cutting tooth 16.

Method, tool set or device, characterized by one or a plurality of the characterizing features of one of the preceding claims.

All of the disclosed features are (alone, but also in combination with one another) essential for the invention. The disclosure content of the corresponding/enclosed priority documents (copy of the earlier application) in its entirety is hereby also included in the disclosure of the application, also for the purpose of adding features of these documents into claims of the present application. With their features, the subclaims characterize independent inventive further developments of the prior art, in particular to file divisional applications on the basis of these claims.

The invention claimed is:

1. A method for producing a toothed workpiece wheel, a tooth root of the workpiece wheel adjoins an end face of the workpiece wheel with a chamfer extending into tooth flanks being formed, wherein the toothing of the workpiece wheel is created by skiving with a gear-cutting tool, wherein the gear-cutting tool has a first number of cutting teeth that each form cutting edges and an axis of rotation which is at a first crossed-axes angle to an axis of rotation of the workpiece wheel, with an infeed in a first infeed direction parallel to a direction of extension of the tooth flanks to be produced and of the tooth root, wherein the chamfer is created by skiving with a chamfer tool, wherein the chamfer tool has a second number of cutting teeth that each form cutting edges and an axis of rotation which is at a second crossed-axes angle to the axis of the workpiece wheel, with an infeed in a second infeed direction parallel to a direction of extension of the chamfer to be produced in the tooth root;
   wherein for each cutting tooth of the chamfer tool, flank-side cutting edges configured to create the chamfer run asymmetrically to a central radial, which runs centrally through the cutting tooth of the chamfer tool;
   wherein the chamfer of the tooth flanks and the tooth root is manufactured without changing an axis intersection angle.

2. The method according to claim 1, wherein the first number of cutting teeth is larger than the second number of cutting teeth.

3. The method according to claim 1, wherein a quotient of the first number of cutting teeth to a number of teeth of the workpiece wheel is greater or equal to ½.

4. The method according to claim 1, wherein a quotient of the second number of cutting teeth and a number of teeth of the workpiece wheel is greater or equal to ⅓.

5. The method according to claim 1, wherein the first crossed-axes angle is larger than the second crossed-axes angle.

6. The method according to claim 1, wherein the first crossed-axes angle is at least 10° larger than the second crossed-axes angle.

7. The method according to claim 1, wherein for each cutting tooth of the chamfer tool, the flank-side cutting edges are configured such that a line through each of the flank-side cutting edges follows through a transition point of the respective flank-side cutting edge to a tool base and through a transition point of the respective flank-side cutting edge to an end face cutting edge, wherein the lines intersect the central radial at different angles and at different distances from a center point of the chamfer tool.

8. A method for producing a toothed workpiece wheel, a tooth root of the workpiece wheel adjoins an end face of the workpiece wheel with a chamfer extending into tooth flanks being formed, wherein the toothing of the workpiece wheel is created by skiving with a gear-cutting tool, wherein the gear-cutting tool has a first number of cutting teeth that each form cutting edges and an axis of rotation which is at a first crossed-axes angle to an axis of rotation of the workpiece wheel, with an infeed in a first infeed direction parallel to a direction of extension of the tooth flanks to be produced and of the tooth root, wherein the chamfer is created by skiving with a chamfer tool, wherein the chamfer tool has a second number of cutting teeth that each form cutting edges and an axis of rotation which is at a second crossed-axes angle to the axis of the workpiece wheel, with an infeed in a second infeed direction parallel to a direction of extension of the chamfer to be produced in the tooth root;
   wherein for each cutting tooth of the chamfer tool, flank-side cutting edges configured to create the chamfer run asymmetrically to a central radial, which runs through a center of a top land of the cutting tooth of the chamfer tool and along an end face of the cutting tooth of the chamfer tool;

wherein the chamfer of the tooth flanks and the tooth root is manufactured without changing an axis intersection angle.

* * * * *